(12) United States Patent
Arimatsu

(10) Patent No.: US 10,948,123 B2
(45) Date of Patent: Mar. 16, 2021

(54) SUPPORTING STRUCTURE AND MACHINE TOOL SYSTEM

(71) Applicant: FANUC CORPORATION, Yamanashi (JP)

(72) Inventor: Yohei Arimatsu, Yamanashi-ken (JP)

(73) Assignee: FANUC CORPORATION, Yamanashi (JP)

( * ) Notice: Subject to any disclaimer, the term of this patent is extended or adjusted under 35 U.S.C. 154(b) by 0 days.

(21) Appl. No.: 16/595,166

(22) Filed: Oct. 7, 2019

(65) Prior Publication Data

US 2020/0116293 A1 Apr. 16, 2020

(30) Foreign Application Priority Data

Oct. 10, 2018 (JP) .............................. JP2018-191928

(51) Int. Cl.
  *F16M 7/00* (2006.01)
  *F16F 7/00* (2006.01)
  *F16F 15/02* (2006.01)
  *F16F 15/00* (2006.01)

(52) U.S. Cl.
  CPC ................ *F16M 7/00* (2013.01); *F16F 7/00* (2013.01); *F16F 15/02* (2013.01); *F16F 15/002* (2013.01); *F16F 2228/066* (2013.01); *F16F 2230/18* (2013.01)

(58) Field of Classification Search
  CPC .... F16M 7/00; F16F 7/00; F16F 15/02; F16F 2230/18; F16F 15/002; F16F 2228/066; B23Q 1/015; B23Q 1/25; B23Q 11/0032
  USPC ..... 248/681, 688, 188.8, 673, 677, 638, 678
  See application file for complete search history.

(56) References Cited

U.S. PATENT DOCUMENTS

| 4,184,665 | A | * | 1/1980 | Queen, Jr. | ................ | B66F 19/00 |
| | | | | | | 254/104 |
| 4,858,865 | A | * | 8/1989 | Schrepfer | ................ | F16M 7/00 |
| | | | | | | 248/188.2 |
| 5,584,464 | A | * | 12/1996 | Whittaker | ................ | F16M 7/00 |
| | | | | | | 248/188.2 |
| 9,416,483 | B1 | * | 8/2016 | Freakes | .................. | D06F 39/125 |
| 9,572,429 | B2 | * | 2/2017 | Basesme | .................. | F16M 7/00 |
| 10,579,089 | B2 | * | 3/2020 | Adoline | .................... | F16F 3/02 |
| 10,660,438 | B2 | * | 5/2020 | Hognaland | ............... | F16M 7/00 |

(Continued)

FOREIGN PATENT DOCUMENTS

| CN | 207554687 U | 6/2018 |
| JP | H06-71771 U | 10/1994 |

(Continued)

*Primary Examiner* — Muhammad Ijaz
(74) *Attorney, Agent, or Firm* — Robert P. Michal, Esq.; Carter, DeLuca & Farrell LLP

(57) ABSTRACT

A supporting structure for supporting a device includes: a base portion configured to support the device; and a plurality of leg portions configured to support the base portion. At least one of the plurality of leg portions includes a height adjusting mechanism whose length is adjustable in a height direction of the base portion, and a ground contact member configured to make contact with a ground. The ground contact member is fixed to the base portion with the height adjusting mechanism sandwiched between the ground contact member and the base portion so as to fix the height adjusting mechanism, and the ground contact member has a ground contact surface formed in the shape of a convex-shaped curved surface.

12 Claims, 7 Drawing Sheets

(56) References Cited

U.S. PATENT DOCUMENTS

| | | | | |
|---|---|---|---|---|
| 2001/0009264 A1* | 7/2001 | Houghton, Jr. | ....... | F16F 15/005 248/550 |
| 2002/0139909 A1* | 10/2002 | Oyama | ................ | G03B 21/145 248/188.8 |
| 2004/0121890 A1* | 6/2004 | Taga | ...................... | B23Q 1/012 483/54 |
| 2013/0112821 A1* | 5/2013 | Brooke | ................. | A47B 91/16 248/188.3 |
| 2016/0081474 A1* | 3/2016 | Basesme | ................ | A47B 91/02 248/188.4 |
| 2018/0206638 A1* | 7/2018 | Spofford | ............... | D06F 39/125 |
| 2020/0116293 A1* | 4/2020 | Arimatsu | ................ | F16F 15/02 |

FOREIGN PATENT DOCUMENTS

| | | |
|---|---|---|
| JP | H07327859 A | 12/1995 |
| JP | 2000107976 A | 4/2000 |
| JP | 2016-049586 A | 4/2016 |

* cited by examiner

SUPPORTING STRUCTURE AND MACHINE TOOL SYSTEM

CROSS-REFERENCE TO RELATED APPLICATION

This application is based upon and claims the benefit of priority from Japanese Patent Application No. 2018-191928 filed on Oct. 10, 2018, the contents of which are incorporated herein by reference.

BACKGROUND OF THE INVENTION

Field of the Invention

The present invention relates to a supporting structure for supporting a device and to a machine tool system.

Description of the Related Art

The machine tool described in Japanese Laid-Open Patent Publication No. 2016-049586 is supported by a supporting structure having four legs with a height adjusting mechanism. Each leg has a flat bottom and hence can stably support the entire machine tool when the floor is a flat surface. Keeping uniform the forces applied to the tool and axes requires keeping the machining table horizontal, and each leg is provided with the height adjusting mechanism for this purpose.

SUMMARY OF THE INVENTION

However, the floor surface of the place where the device, as a machine tool, is installed is not always an ideal flat surface. Even if the floor is substantially a horizontal flat surface, the floor surface on which the legs rest has, when viewed microscopically, irregularities such as unevenness of concrete mortar, fine steps due to cracks, aging undulation of the floor, marks of trowels made during the construction work, etc. Accordingly, for the machine tool described in Japanese Laid-Open Patent Publication No. 2016-049586, it is actually impossible to cause the entire bottom surfaces of the leg components to stably rest on a non-ideal floor. This causes unsteadiness or rattling of the supporting mechanism and device and makes it impossible to realize highly precise machining or operations.

The height adjusting mechanism has the problem that its length in the height direction is prone to shift. Hence, the length in the height direction shifts due to vibrations caused by the unsteadiness or rattling of the supporting mechanism and then the supporting mechanism is unable to keep the device stable.

Accordingly, an object of the present invention is to provide a supporting structure and a machine tool system capable of stably supporting a device even on a non-ideal floor.

According to a first aspect of the present invention, a supporting structure for supporting a device includes: a base portion configured to support the device; and a plurality of leg portions configured to support the base portion. At least one of the plurality of leg portions includes a height adjusting mechanism whose length is adjustable in a height direction of the base portion, and a ground contact member configured to make contact with a ground. The ground contact member is fixed to the base portion with the height adjusting mechanism sandwiched between the ground contact member and the base portion so as to fix the height adjusting mechanism, and the ground contact member has a ground contact surface formed as a convex-shaped curved surface.

According to a second aspect of the present invention, a machine tool system includes the supporting structure described above and the device being a machine tool.

According to the present invention, it is possible to obtain a supporting structure and a machine tool system that are capable of stably supporting a device even on a non-ideal floor.

The above and other objects, features, and advantages of the present invention will become more apparent from the following description when taken in conjunction with the accompanying drawings, in which a preferred embodiment of the present invention is shown by way of illustrative example.

DESCRIPTION OF THE PREFERRED EMBODIMENTS

The supporting structure and machine tool system according to the present invention will be described in detail below in conjunction with the preferred embodiments while referring to the accompanying drawings.

Embodiment

Figure 1:
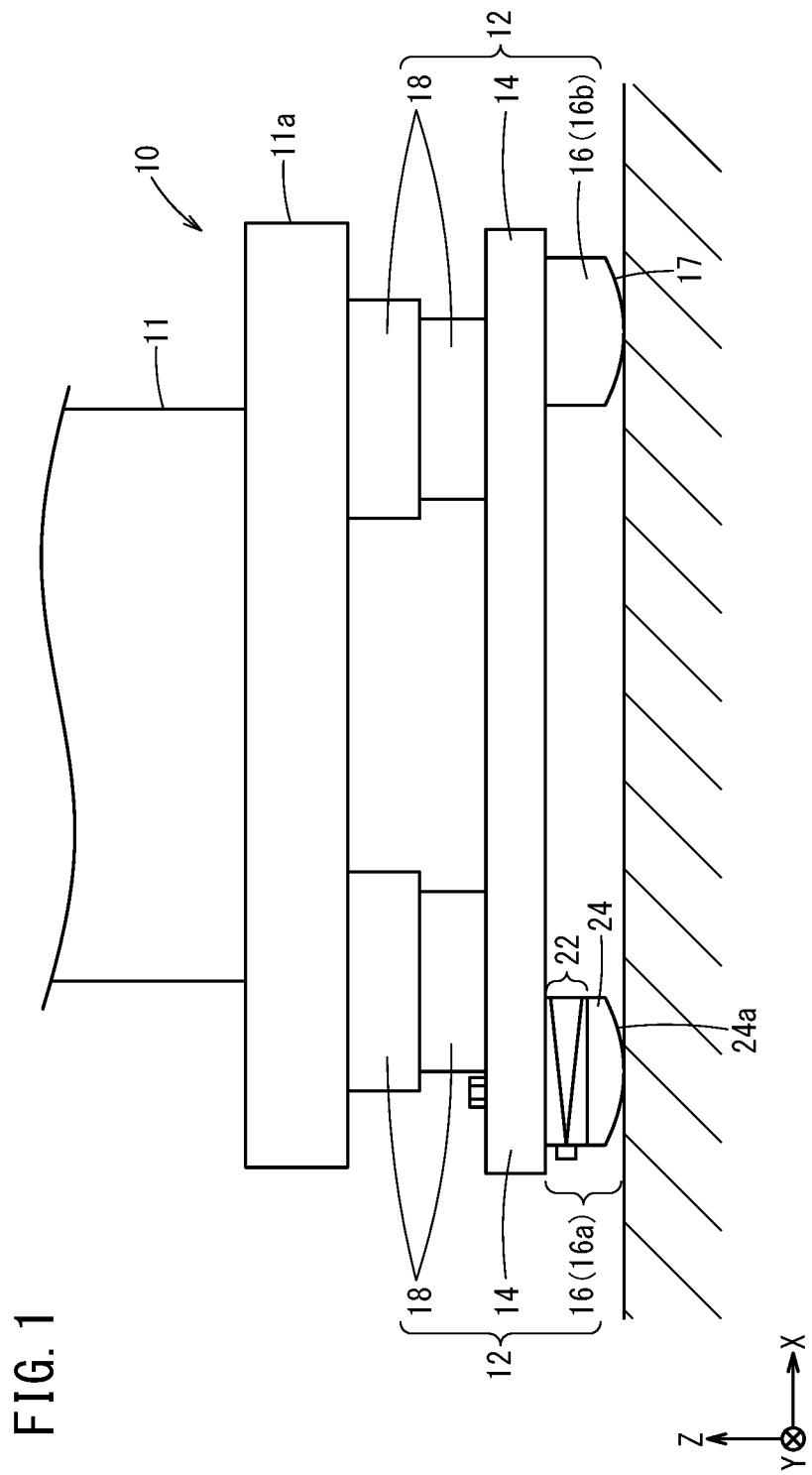
FIG. 1 is a side view showing a structure of a machine tool system.

FIG. 1 is a side view showing the structure of a machine tool system 10. The machine tool system 10 includes a device 11 as a machine tool, a support stand 11a on which the device 11 is situated, and a supporting structure 12 for supporting the device 11 and the support stand 11a. The supporting structure 12 includes a base portion 14 as a pedestal that supports the device 11, and a plurality of leg portions 16 that support the base portion 14. The supporting structure 12 further includes a vibration suppression portion 18 that is placed above the base portion 14 and under the device 11 to suppress vibrations. The vibration suppression portion 18 is provided on the base portion 14, and the vibration suppression portion directly supports the support stand 11a. The leg portions 16 are main legs that are indispensable to supporting the weight of the entirety of the machine tool system 10. The supporting structure 12 has three or more leg portions 16. The supporting structure 12 may further have an auxiliary leg or legs in addition to the main legs.

A specific example of the device 11 can be an ultra-high precision machine tool. Ultra-high precision machine tools are required to implement resolution of machining accuracy of 100 nanometers or less, where position control commands are provided in units of 10 nanometers or less. Another example of the device 11 can be a semiconductor wafer grinder. The machining table of the device 11 supported by the supporting structure 12 requires levelness of 0.2 mm/1 m or less, as the target of horizontal level.

The leg portion 16a, which is one of the plurality of leg portions 16, includes a height adjusting mechanism 22 whose length is adjustable in a height direction of the base portion 14 (in a Z direction) and a ground contact member 24 that comes into contact with the floor of the place where the supporting structure 12 is installed. The floor of the place of installation is parallel to an X direction and a Y direction and the direction of gravity is in a −Z direction. The vertical direction is designated by defining the Z direction as an upward direction and the −Z direction as a downward direction. The height adjusting mechanism 22 is provided for the purpose of leveling the machining table of the device 11, and so on. The ground contact member 24 is fixed to the base portion 14 with the height adjusting mechanism 22 interposed between the base portion 14 and the ground contact member 24, whereby the ground contact member 24 fixes the height adjusting mechanism 22. The ground contact member 24 has a ground contact surface 24a formed in the shape of a convex, curved surface. At least one of the plurality of leg portions 16 has to be configured as the leg portion 16a having the height adjusting mechanism 22 and the ground contact member 24. All of the plurality of leg portions 16 may be formed as leg portions 16a having the height adjusting mechanism 22 and the ground contact member 24.

The leg portion 16b, one of the plurality of leg portions 16, does not include the height adjusting mechanism 22, but the ground contact surface 17 of the leg portion 16b is formed in the shape of a convex-shaped curved surface like the ground contact surface 24a. Accordingly, when the plurality of leg portions 16 is composed of the leg portions 16a and 16b, the ground contact surfaces of all of the plurality of leg portions 16 are formed as convex-shaped curved surfaces.

The supporting structure 12 is stable when it has three or more leg portions 16, and so providing at least three leg portions 16 each with a convex-shaped curved ground contact surface suffices. Then, when the floor surface has irregularities, the convex-shaped curved surfaces can certainly catch and contact the floor surface substantially at a point, thereby preventing unsteadiness or rattling of the supporting structure 12 and reliably stabilizing the supporting structure 12. When at least one of the leg portions 16 that have such convex-shaped curved ground contact surfaces is constructed as the leg portion 16a having the height adjusting mechanism 22 and the ground contact member 24, then the remaining leg portions 16 may be constructed as the leg portion 16b having no height adjusting mechanism 22. Also, as long as at least three leg portions 16 have the convex-shaped curved ground contact surfaces, the supporting structure 12 may further include auxiliary leg portion(s) having a flat ground contact surface, separately from the leg portions 16.

Figure 2:
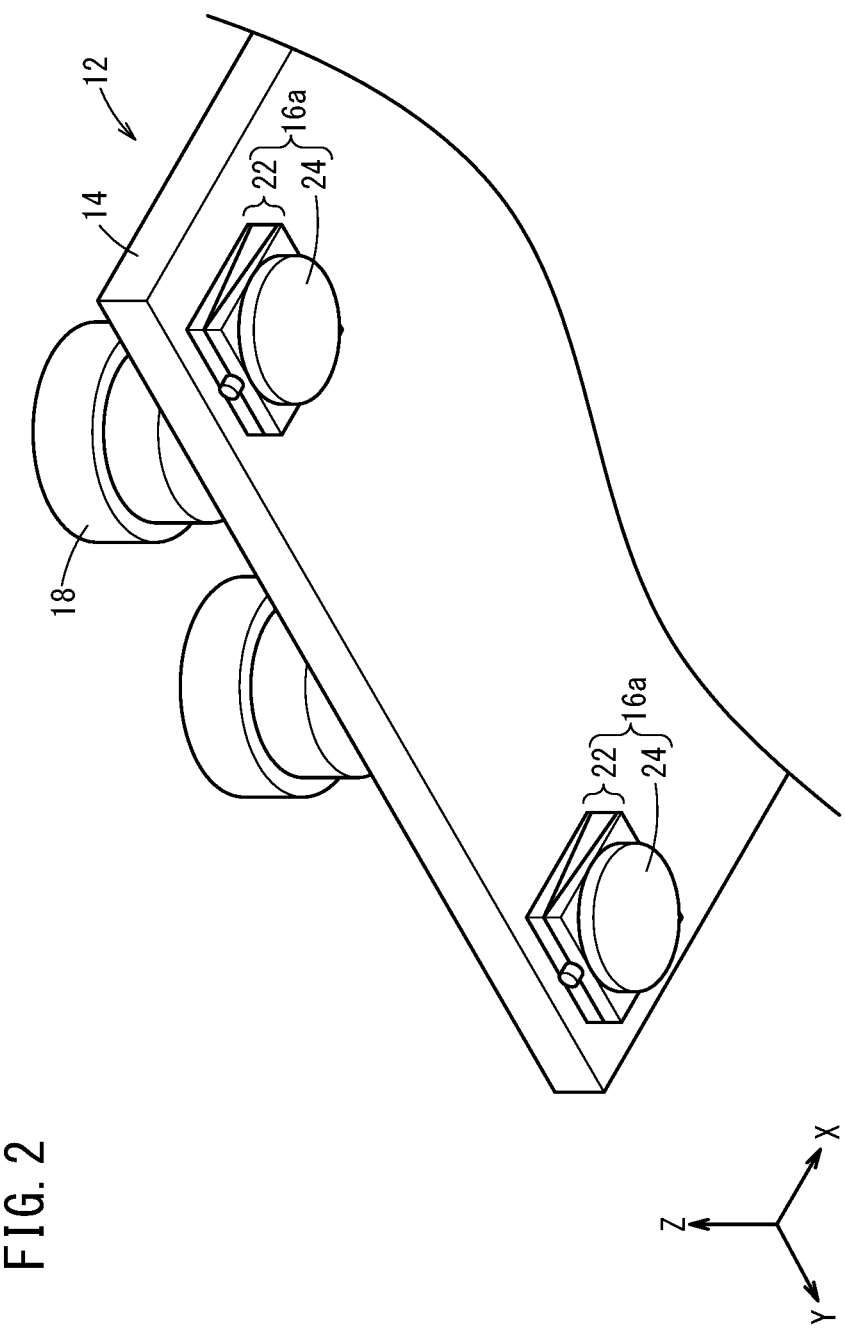
FIG. 2 is a perspective view showing part of a supporting structure.

FIG. 2 is a perspective view showing part of the supporting structure 12. FIG. 2 shows two leg portions 16a each having the height adjusting mechanism 22 and the ground contact member 24 and arranged in the Y direction. Enabling the vibration suppression portion 18 to function effectively requires high rigidity of the base portion 14 and leg portions 16. Accordingly, the ground contact members 24 have to be made of sufficiently thick metal, or other material having equivalent rigidity. For example, the material used to form the ground contact members 24 can be metal such as SS400 or S45C. It is preferable to select the material of the ground contact members 24 by taking into consideration hardness or fragility of the concrete of the floor on which the supporting structure 12 is placed. It is also preferred that the ground contact surface 24a of the ground contact member 24 be formed as a curved surface in the shape of a partial spherical surface having a radius R of around 50 to 1000 mm. A curved surface in the shape of a partial spherical surface having a radius R between 100 to 500 mm is particularly preferred. Then, when the floor surface has irregularities, the convex-shaped curved surface of the ground contact surface 24a can catch and come in contact with the floor surface substantially at a point in a more preferable manner.

The appropriate allowable load of the supporting structure 12 becomes smaller as the radius R becomes smaller, but the adaptable ranges of the degree of floor irregularities and the slant of the floor surface become wider. On the other hand, the load that the supporting structure 12 can hold becomes larger as the radius R becomes larger, but the adaptable ranges of the degree of floor irregularities and the slant of the floor surface become narrower. For example, assuming that the slant of the floor surface is up to 5 degrees, then a spherical surface having a radius R of around 300 to 400 mm is preferred if the weight of the entire machine on the supporting structure 12 of FIG. 1 is around 1 to 5 tons.

Figure 3:
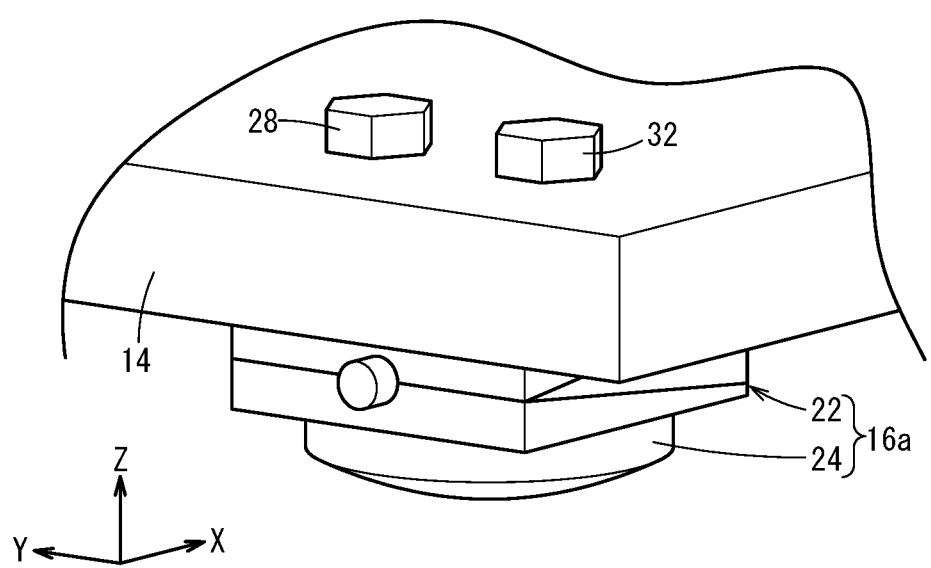
FIG. 3 is a perspective view showing a leg portion that is fixed to a base portion.
Figure 4:
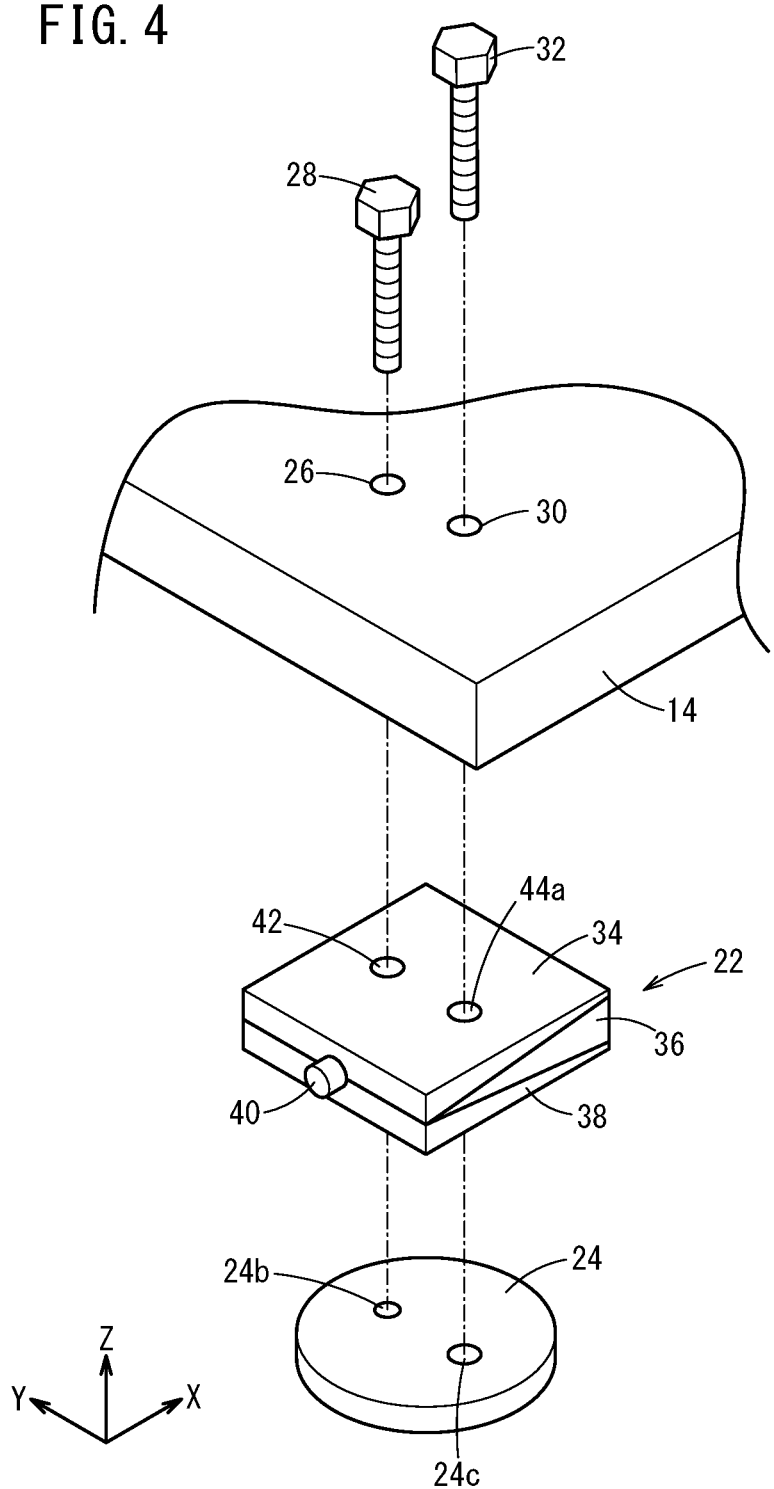
FIG. 4 is a perspective view showing a height adjusting mechanism and a ground contact member before being fixed to the base portion.
Figure 5:
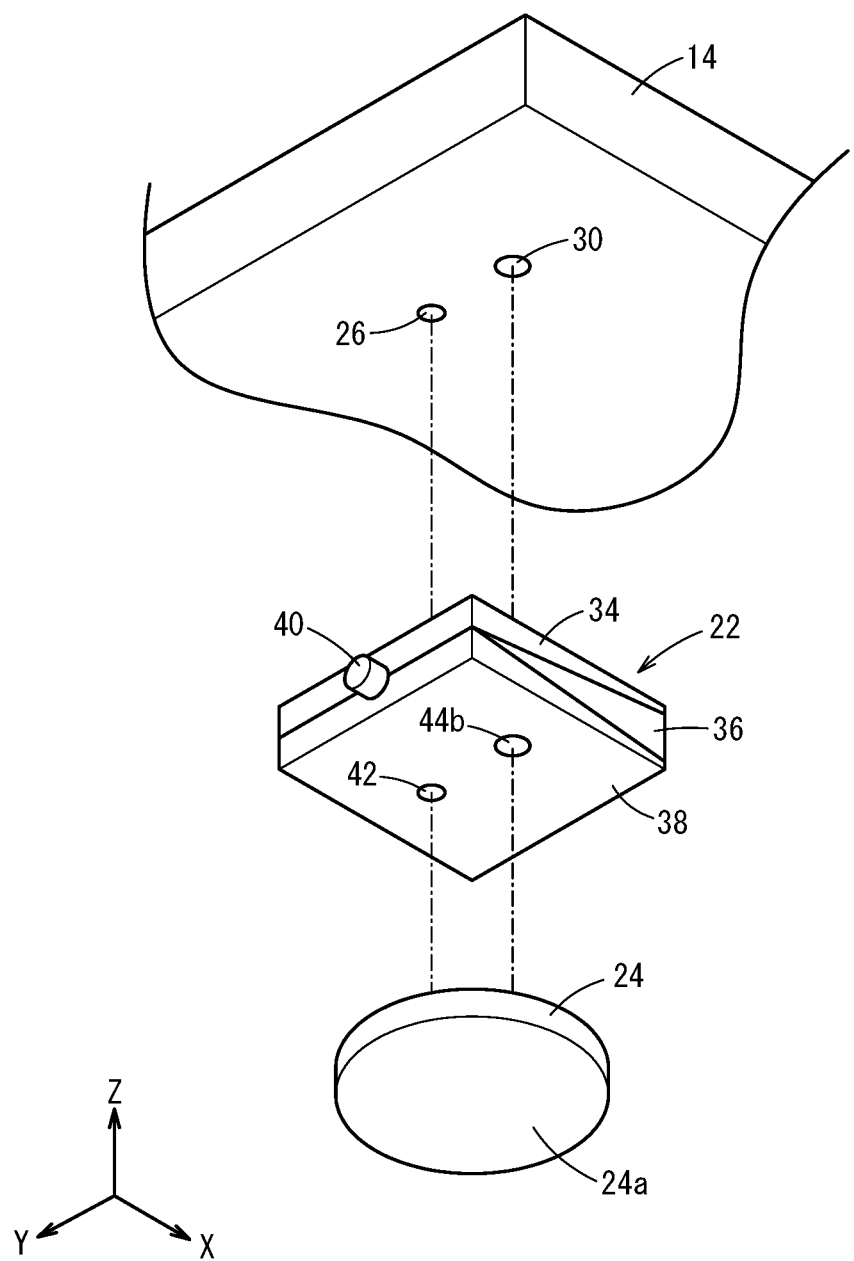
FIG. 5 is another perspective view showing the height adjusting mechanism and the ground contact member before being fixed to the base portion.

FIG. 3 is a perspective view showing the leg portion 16a that is fixed to the base portion 14. FIG. 4 is a perspective view showing the height adjusting mechanism 22 and the ground contact member 24 before being fixed to the base portion 14. FIG. 5 is another perspective view showing the height adjusting mechanism 22 and the ground contact member 24 before being fixed to the base portion 14.

As shown in FIG. 4, the height adjusting mechanism 22 and the ground contact member 24 are fixed to the base portion 14 by a first bolt 28 that is inserted in a bolt hole 26 formed in the base portion 14 and a second bolt 32 that is inserted in a bolt hole 30 formed in the base portion 14. The height adjusting mechanism 22 includes an upper member 34, a wedge-shaped member 36, a lower member 38, and a height adjusting bolt 40. In the height adjusting mechanism 22, the upper member 34 and the lower member 38, which are two members having respective tapered surfaces inclined at the same angles as the wedge-shaped member 36, sandwich the wedge-shaped member 36 from above and below. Each tapered surface is a slanted surface whose height in the Z direction varies in the X direction. The height adjusting bolt 40 extending in the X direction is screw-engaged with the wedge-shaped member 36. Turning the height adjusting bolt 40 in one direction drives the wedge-shaped member 36 in the X direction and turning the height adjusting bolt 40 in the other direction drives the wedge-shaped member 36 in the −X direction. Thus, by operating the height adjusting bolt 40, the vertical interval between the upper member 34 and the lower member 38 is varied, whereby the length of the height adjusting mechanism 22 in the height direction (Z direction) can be controlled in an appropriate manner. Thus, it is possible to make adjustment to keep the machining table of the device 11 horizontal, by operating the height adjusting bolt 40 according to the slant of the floor so as to adjust the length of the height adjusting mechanism 22 in the height direction (Z direction).

Further, the upper member 34, wedge-shaped member 36, and lower member 38 respectively have through holes 42 through which the first bolt 28 passes. Further, the ground contact member 24 has a threaded hole 24b that is screw-engaged with the thread of the first bolt 28. That is, the first bolt 28 is a bolt that is screw-engaged with the ground contact member 24. The through hole 42 of the wedge-shaped member 36 is formed in the shape of an elongated hole having a diameter in the X direction larger than that in the Y direction such that it does not interfere with the first bolt 28. The ground contact member 24 is fixed to the base portion 14 by the first bolt 28, with the height adjusting mechanism 22 sandwiched between the ground contact member 24 and the base portion 14. As a result, the height adjusting mechanism 22 can be reliably fixed to the base portion 14.

Further, the upper member 34 and the wedge-shaped member 36 respectively have through holes 44a through which the second bolt 32 passes, and the lower member 38 has a threaded hole 44b that is screw-engaged with the thread of the second bolt 32. That is, the second bolt 32 is a bolt that is screw-engaged with the lower member 38. Further, the ground contact member 24 has a clearance hole 24c corresponding to the tip of the second bolt 32. The through hole 44a of the wedge-shaped member 36 is formed in the shape of an elongated hole having an X-direction diameter larger than the Y-direction diameter such that it does not interfere with the second bolt 32. The lower member 38 is fixed to the base portion 14 by the second bolt 32, with the upper member 34 and the wedge-shaped member 36 sandwiched between the lower member 38 and the base portion 14. As a result, the entirety of the height adjusting mechanism 22 can be reliably fixed to the base portion 14.

In the machine tool system 10 that is required to perform highly precise machining, vibrations hinder its highly precise machining operations. As a countermeasure against it, the entirety of the device 11 including the machining table is disposed on the vibration suppression portion 18. The vibration suppression portion 18 has a vibration isolation function to suppress vibrations from the floor so as to prevent the vibrations from being transmitted to the support stand 11a and the device 11 on the vibration suppression portion 18. In this case, the vibration suppression portion 18 executes an active vibration isolation control of detecting vibrations in the floor and cancelling the vibrations.

Further, the vibration suppression portion 18 has an anti-vibration function to suppress vibrations from the device 11 so as to prevent the vibrations from being transmitted to the floor. The vibration suppression portion 18 may further execute anti-vibration control to suppress vibrations from various vibration sources inside and outside of the device 11 and support stand 11a. The vibration suppression portion 18 can thus keep the support stand 11a and the device 11 supported on the vibration suppression portion 18 at a certain position in space as if they are suspended from one point in the sky. That is, this realizes a skyhook damper. This allows the machining point, which is the position at which the device 11 actually performs machining operation, to be kept at a certain position in the space.

Although the vibration suppression portion 18 has both of the vibration isolation function and the anti-vibration function, it may have only one of the functions. That is, the device 11 can be stably controlled as long as the vibration suppression portion 18 can suppress at least one of vibration from the floor and vibration from the device 11.

Effects of this embodiment will be explained below. The height adjusting mechanism 22 composed of the wedge-shaped member 36 and the upper member 34 and lower member 38 vertically sandwiching the wedge-shaped member 36 is a structure whose length in the height direction tends to vary. However, according to the supporting structure 12 of this embodiment, the ground contact member 24 is fixed to the base portion 14 with the height adjusting mechanism 22 interposed between the ground contact member 24 and the base portion 14, so that the height adjusting mechanism 22 is firmly fixed to the base portion 14 to prevent unsteadiness or rattling. As a result, the length of the height adjusting mechanism 22 in the height direction is less likely to vary, and the leg portion 16a is stabilized. Furthermore, the ground contact surface 24a of the ground contact member 24 is formed as a convex-shaped curved surface. Accordingly, with respect to irregularities of a non-ideal floor surface, the convex-shaped curved surface of the ground contact surface 24a can catch and contact the floor surface substantially at a point, thereby preventing unsteadiness or rattling of the supporting structure 12. Since the supporting structure 12 is placed in contact with the ground surface (the ground) through the convex-shaped curved surfaces so that the supporting structure 12 is stable, in addition to the effect above, the supporting structure 12 can stably support the device 11. This makes it possible to improve the performance of the machine tool system 10 that is required to perform high-precision machining operations.

Further, when the supporting structure 12 includes the vibration suppression portion 18, dynamic loads that vary in magnitude due to the anti-vibration operation take place and act on the leg portions 16. However, the use of the leg portions 16 of this embodiment maintains rigidity of the portions around the leg portions 16 to thereby prevent deterioration of the vibration isolation function and anti-vibration function of the vibration suppression portion 18. That is, since the supporting structure 12 is stabilized, the vibration suppression portion 18 can exert its maximum control performance. As a result, the device 11 can be stably controlled in the skyhook damper state. Then, various machining axes of the device 11 can be controlled more highly precisely, and thus it is possible to further improve the performance of the device 11, such as an ultra-high precision machine tool or ultra-high precision grinding machine, that is required to perform high-precision machining operations.

[Modifications]

The above-described embodiment may be modified as explained below.

<First Modification>

Figure 6:
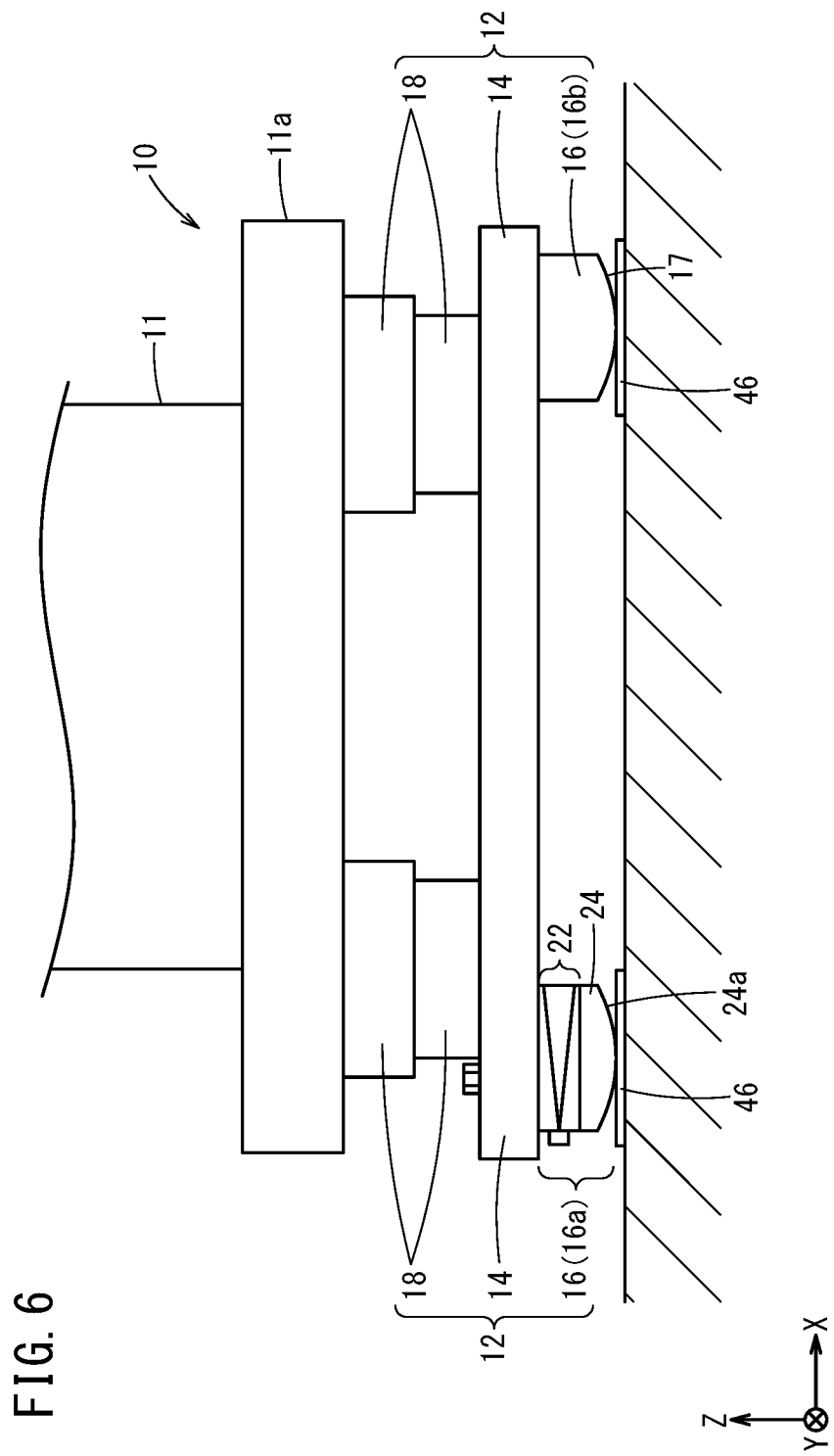
FIG. 6 is a side view showing the structure of a supporting structure for supporting a device, according to a first modification.

FIG. 6 is a side view showing the structure of a supporting structure 12 supporting the device 11 according to a first modification. FIG. 6 shows a ground contact member 24 being in contact with the ground through a metal plate 46. The ground contact surface 24a of the ground contact member 24 is in contact with the ground through the metal plate 46 in order that the ground contact surface 24a being a convex-shaped curved surface of the ground contact member 24 will more suitably fit the irregularities of the floor of the place where the supporting structure 12 is installed. The leg portion 16b also has a ground contact surface 17 which is in contact with the ground through a metal plate 46. The metal plate 46 is a metal sheet made of relatively soft material, such as an aluminum sheet, copper sheet, mild steel sheet, etc. The thickness of the metal plate 46 is desirably around 0.1 to 5 mm, and particularly preferably around 0.5 to 3 mm. With the metal plate 46 being suitably held between the floor and the ground contact member 24, the metal plate 46 absorbs fine irregularities of the concrete floor. At the same time, the convex-shaped curved surface of the ground contact surface 24a moderately sinks in the metal plate 46, which is effective to implement a more preferable contact condition of the supporting structure 12. Incidentally, for example, using material like rubber or mat in place of the metal plate 46 will hinder the control by the vibration suppression portion 18 since rubber and mat are soft elastic bodies. An iron plate with insufficient thinness is not preferable as the metal plate 46, either, because it can also be an elastic body.

<Second Modification>

FIGS. 3 and 4 show one first bolt 28 that is screw-engaged with the ground contact member 24 and one second bolt 32 that is screw-engaged with the lower member 38. However, a plurality of the first bolts 28 may be employed, with a corresponding plurality of the through holes 42 being formed in the upper member 34, wedge-shaped member 36, and lower member 38, and with a corresponding plurality of the threaded holes 24b being formed in the ground contact member 24. The second bolt 32 may be absent. Further, as long as at least one first bolt 28 is present, a plurality of the second bolts 32 may be employed. Using a plurality of first bolts 28 or second bolts 32 allows the ground contact member 24 and the height adjusting mechanism 22 to be further reliably fixed to the base portion 14.

<Third Modification>

Figure 7:
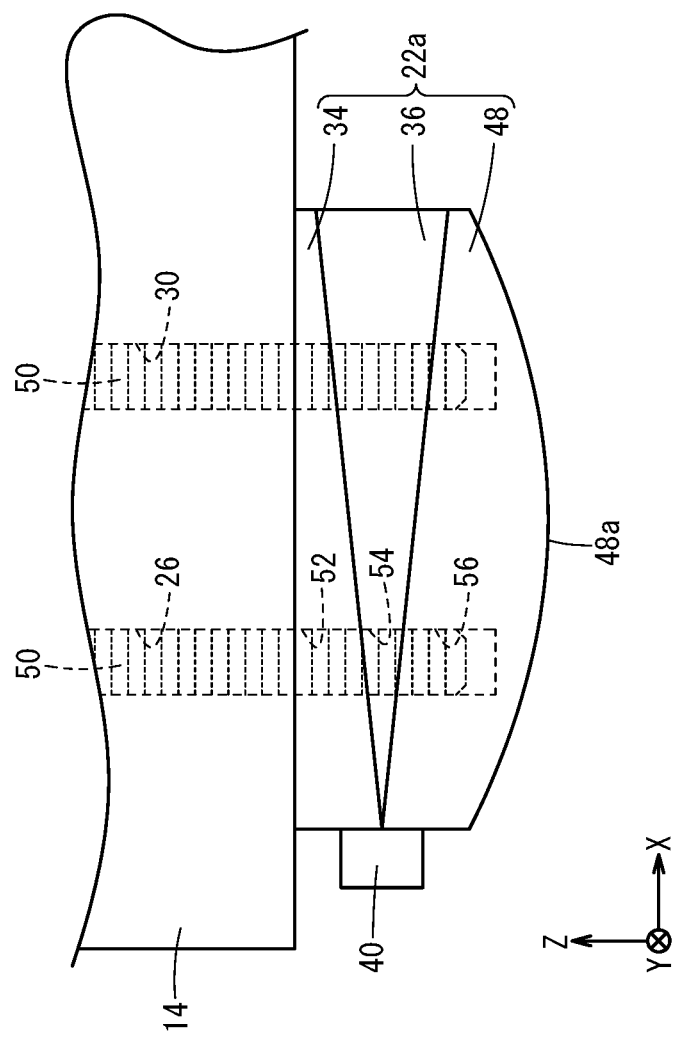
FIG. 7 is a side view showing the structure of a height adjusting mechanism, according to a third modification.

FIG. 7 is a side view showing the structure of a height adjusting mechanism 22a according to a third modification. The height adjusting mechanism 22a includes an upper member 34, a wedge-shaped member 36, a lower member 48, and a height adjusting bolt 40. The lower member 48 functions similarly to the lower member 38 of the above embodiment and further functions also as the ground contact member 24 of the embodiment. That is, the lower member 48 has a ground contact surface 48a that is formed in the shape of a convex-shaped curved surface like the ground contact surface 24a of the ground contact member 24.

As shown in FIG. 7, the height adjusting mechanism 22a is fixed to the base portion 14 by a bolt 50 inserted in a bolt hole 26 formed in the base portion 14 and a bolt 50 inserted in a bolt hole 30 formed in the base portion 14. FIG. 7 illustrates two bolts 50, but one bolt 50 or three or more bolts 50 may be employed.

The upper member 34 has through holes 52 through which the bolts 50 pass respectively, the wedge-shaped member 36 has through holes 54 through which the bolts 50 pass respectively, and the lower member 48 has threaded holes 56 which are screw-engaged respectively with the threads of the bolts 50. That is, the bolts 50 are bolts that are screw-engaged with the lower member 48. Each through hole 54 of the wedge-shaped member 36 is formed as an elongated hole having an X-direction diameter larger than its Y-direction diameter such that it will not interfere with the bolt 50. The bolts 50 fix the lower member 48 to the base portion 14 with the upper member 34 and the wedge-shaped member 36 interposed between the lower member 48 and the base portion 14. As a result, the entirety of the height adjusting mechanism 22a can be reliably fixed to the base portion 14.

That is, the bottom surface of the height adjusting mechanism 22a itself is formed as a convex-shaped curved surface. This eliminates the need to provide the ground contact member 24 in addition to the height adjusting mechanism 22 as described in the embodiment above and enables the device 11 to be supported stably with a smaller number of parts of the supporting structure 12 than in the embodiment above.

<Fourth Modification>

The supporting structure 12 can be applied to devices 11 other than machine tools, and the device 11 and the support stand 11a may constitute an ultra-high precision measuring instrument capable of measurement in the order of nanometers or picometers. Employing the supporting structure 12 of the embodiment enables improvement of the performance of the ultra-high precision measuring instrument.

<Fifth Modification>

The first to fourth modifications may be combined in an arbitrary manner within a rage where no contradiction is incurred.

Invention Obtained from Embodiments

The invention that can be grasped from the embodiment and modifications above will be recited below.

<First Invention>

The supporting structure (12) for supporting a device (11) includes: a base portion (14) configured to support the device; and a plurality of leg portions (16) configured to support the base portion (14). At least one of the plurality of leg portions (16) includes a height adjusting mechanism (22) whose length is adjustable in a height direction of the base portion (14), and a ground contact member (24) configured to make contact with a ground. The ground contact member (24) is fixed to the base portion (14) with the height adjusting mechanism (22) sandwiched between the ground contact member (24) and the base portion (14) so as to fix the height adjusting mechanism (22), and the ground contact member (24) has a ground contact surface (24a) formed as a convex-shaped curved surface.

Thus, the height adjusting mechanism (22) is firmly fixed to the base portion (14) to thereby prevent unsteadiness or rattling thereof. This provides the advantageous effect that the length of the height adjusting mechanism (22) in the height direction is less likely to vary. With respect to a non-ideal floor surface having irregularities, the convex-shaped curved surface of the ground contact surface (24a) can catch and contact the floor surface substantially at a point, thereby preventing unsteadiness or rattling of the supporting structure (12). Thus, the supporting structure (12) is in contact with the ground surface through the convex-shaped curved surface so as to be stably disposed, so that, together with the effect stated above, the supporting structure (12) can support the device (11) stably.

The supporting structure (12) may further include a vibration suppression portion (18) provided above the base portion (14) and under the device (11), the vibration suppression portion being configured to suppress vibration. The vibration suppression portion (18) can thus exert its maximum control performance and enables further improvement of the performance of the device (11) that is required to perform high-precision machining operations.

The height adjusting mechanism (22) may include a wedge-shaped member (36), an upper member (34), and a lower member (38), the upper member and the lower member sandwiching the wedge-shaped member (36) from above and below.

The wedge-shaped member (36), the upper member (34), and the lower member (38) may have respective through holes (42) through which a first bolt (28) passes. The ground contact member (24) may have a threaded hole (24b) configured to be screw-engaged with a thread of the first bolt (28). Then, the height adjusting mechanism (22) can be reliably fixed to the base portion (14).

The wedge-shaped member (36) and the upper member (34) may have respective through holes (44a) through which a second bolt (32) passes, and the lower member (38) may have a threaded hole (44b) configured to be screw-engaged with a thread of the second bolt (32). The ground contact member (24) may have a clearance hole (24c) that corresponds to a tip of the second bolt (32). Then, the entire height adjusting mechanism (22) can be reliably fixed to the base portion (14).

The lower member (48) may function also as the ground contact member (24). This eliminates the need to provide the ground contact member (24) in addition to the height adjusting mechanism (22) and enables the device (11) to be stably supported with a reduced number of parts of the supporting structure (12).

The wedge-shaped member (36) and the upper member (34) may have respective through holes (52, 54) through which a bolt (50) passes. The lower member (48) may have a threaded hole (56) configured to be screw-engaged with a thread of the bolt (50). Then, the entire height adjusting mechanism (22a) can be reliably fixed to the base portion (14).

At least three of the leg portions (16) of the supporting structure (12) may each have a ground contact surface formed as a convex-shaped curved surface. This reliably stabilizes the supporting structure (12).

The vibration suppression portion (18) may be configured to suppress at least one of vibration from a floor and vibration from the device (11). Owing thereto, the device (11) can be controlled stably.

The ground contact member (24) may be in contact with a ground through a metal plate (46). Then, the supporting structure (12) can make contact with the ground surface in a more preferable condition.

The ground contact surface (24a) of the ground contact member (24) may be formed as a partial-sphere-shaped curved surface. Then, with respect to the floor surface having irregularities, the convex-shaped curved surface of the ground contact surface (24a) can catch and come in contact with the floor surface substantially at a point in a more preferable manner.

<Second Invention>

A machine tool system (10) includes the above-described supporting structure (12) and the device (11) being a machine tool.

It is thus possible to improve the performance of the machine tool system (10) required to perform high-precision machining operations.

The present invention is not particularly limited to the embodiment described above, and various modifications are possible without departing from the essence and gist of the present invention.

What is claimed is:

1. A supporting structure for supporting a device, comprising:
a base portion configured to support the device; and
a plurality of leg portions configured to support the base portion,
wherein at least one of the plurality of leg portions includes a height adjusting mechanism whose length is adjustable in a height direction of the base portion, and a ground contact member configured to make contact with a ground, the ground contact member is fixed to the base portion with the height adjusting mechanism sandwiched between the ground contact member and the base portion so as to fix the height adjusting mechanism, and the ground contact member has a ground contact surface formed as a convex-shaped curved surface,
the height adjusting mechanism includes a wedge-shaped member, an upper member, and a lower member, the upper member and the lower member sandwiching the wedge-shaped member from above and below, the base portion and the ground contact member sandwiching the height adjusting mechanism from above and below, whereby the height adjusting mechanism is fixed.

2. The supporting structure according to claim 1, further comprising a vibration suppression portion provided above the base portion and under the device, the vibration suppression portion being configured to suppress vibration.

3. The supporting structure according to claim 1,
wherein the wedge-shaped member, the upper member, and the lower member have respective through holes through which a first bolt passes, and
the ground contact member has a threaded hole configured to be screw-engaged with a thread of the first bolt.

4. The supporting structure according to claim 3,
wherein the wedge-shaped member and the upper member have respective through holes through which a second bolt passes, and the lower member has a threaded hole configured to be screw-engaged with a thread of the second bolt, and
the ground contact member has a clearance hole that receives a tip of the second bolt.

5. The supporting structure according to claim 1, wherein the lower member functions also as the ground contact member.

6. The supporting structure according to claim 5,
wherein the wedge-shaped member and the upper member have respective through holes through which a bolt passes, and
the lower member has a threaded hole configured to be screw-engaged with a thread of the bolt.

7. The supporting structure according to claim 1, wherein at least three of the leg portions each have a respective ground contact surface formed as a convex-shaped curved surface.

8. The supporting structure according to claim 2, wherein the vibration suppression portion is configured to suppress at least one of vibration from a floor and vibration from the device.

9. The supporting structure according to claim 1, wherein the ground contact member is in contact with the ground through a metal plate.

10. The supporting structure according to claim 1, wherein the ground contact surface of the ground contact member is formed as a partial-sphere-shaped curved surface.

11. A machine tool system comprising:
a machine tool; and
a supporting structure for supporting the machine tool, the supporting structure comprising:
a base portion configured to support the machine tool; and
a plurality of leg portions configured to support the base portion,
wherein at least one of the plurality of leg portions includes a height adjusting mechanism whose length is adjustable in a height direction of the base portion, and a ground contact member configured to make contact with a ground, the ground contact member fixed to the base portion with the height adjusting mechanism sandwiched between the ground contact member and the base portion so as to fix the height adjusting mechanism, and the ground contact member has a ground contact surface formed as a convex-shaped curved surface, the height adjusting mechanism includes a wedge-shaped member, an upper member, and a lower member, the upper member and the lower member sandwiching the wedge-shaped member from above and below, the base portion and the ground contact member sandwiching the height adjusting mechanism from above and below, whereby the height adjusting mechanism is fixed.

12. The supporting structure according to claim 1, wherein the height adjusting mechanism includes a height adjusting bolt that is screw-engaged with the wedge-shaped member to change a vertical interval between the upper member and the lower member.

\* \* \* \* \*